United States Patent [19]

St. Jean

[11] Patent Number: 4,890,393
[45] Date of Patent: Jan. 2, 1990

[54] MEASURING TAPE GUIDE ATTACHMENT

[76] Inventor: Joseph D. P. St. Jean, P.O. Box 377, Morrow Street, Grenville, Quebec, Canada, J0V 1J0

[21] Appl. No.: 200,559

[22] Filed: May 31, 1988

[51] Int. Cl.⁴ .......................... G01B 3/08; G01B 3/10; B43L 13/00; B43L 13/04
[52] U.S. Cl. ........................................ 33/768; 33/668; 33/42
[58] Field of Search ................ 33/137, 138, 173, 668, 33/42, 483, 484; 242/106

[56] References Cited

U.S. PATENT DOCUMENTS

| | | | |
|---|---|---|---|
| 311,584 | 2/1885 | Hunt et al. | 33/173 |
| 356,533 | 1/1887 | Hall | 33/42 |
| 452,677 | 5/1891 | Morrill | 33/173 |
| 523,380 | 7/1894 | Snell | 33/173 |
| 1,491,437 | 4/1924 | Taylor | 33/138 |
| 1,599,852 | 9/1926 | Thomas | 33/173 |
| 2,549,503 | 4/1951 | McCully | 33/138 |
| 2,795,050 | 6/1957 | Van Fleet | 33/138 |
| 3,160,957 | 12/1964 | Phillips | 33/173 |
| 3,181,242 | 5/1965 | Cook | 33/138 |
| 3,192,630 | 7/1965 | Dineson | 33/138 |
| 3,744,134 | 7/1973 | Zima, Jr. | 33/138 |
| 3,823,481 | 7/1974 | Chapin | 33/138 |
| 3,842,510 | 10/1974 | Elliott | 33/668 |
| 4,113,199 | 9/1978 | Marino | 242/106 |
| 4,200,984 | 5/1980 | Fink | 33/138 |

FOREIGN PATENT DOCUMENTS 1097569 7/1955 France ............................... 33/42

Primary Examiner—William A. Cuchlinski, Jr.
Assistant Examiner—Thomas B. Will

[57] ABSTRACT

An attachment for a tape measure that provides a guide for marking when moving the tape along the work piece. The attachment is in the form of a T-square with a stem part that projects at one end thereof into the tape dispensing opening of the casing for the tape measure and at the other end has an angle head part at right angles to the stem. The angle head part has a first flange that rests and slides on the surface of the work piece to be marked and a second flange at right angles thereto that engages and slides along an edge of the work piece. The flanges are turned upwardly at their ends to form a skate and tabs project from the stem to prevent lateral displacement of the tape measure on the guide during use and also serve as stops limiting penetration of the device into the tape measure casing.

7 Claims, 2 Drawing Sheets

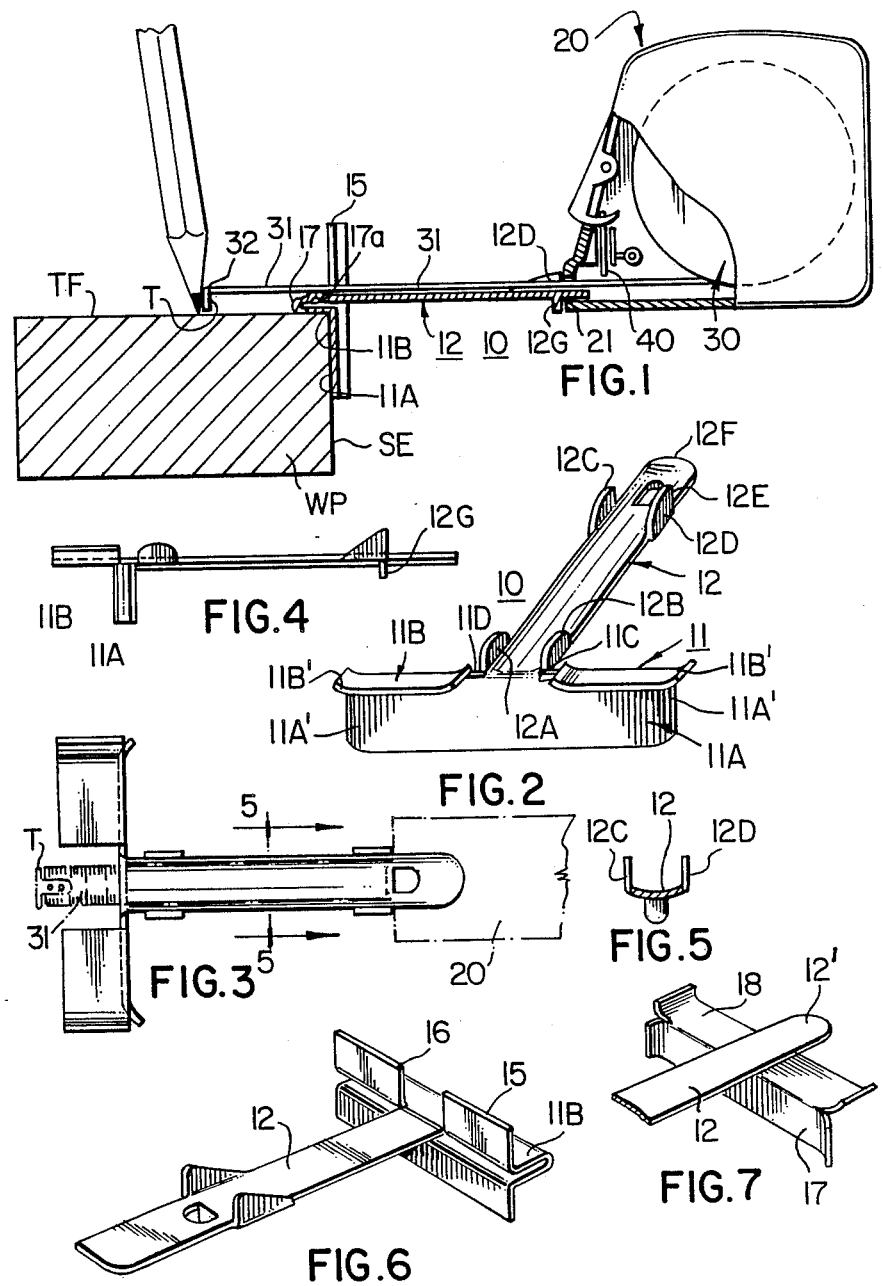

MEASURING TAPE GUIDE ATTACHMENT

FIELD OF INVENTION

This invention relates to measuring tapes and more particularly to an attachment for commonly used metal measuring tapes to provide a guide for use in marking a cutline or the like on a work piece.

BACKGROUND OF INVENTION

A common technique used by carpenters or others for marking a line on a work piece is to clamp a measuring tape between two fingers at the desired length relative to an edge of the work piece and then slide such fingers along the edge of the work piece while holding a pencil with the other hand at the end of the tape, drawing a line along the top of the work piece as the tape is moved. This, however, is dangerous because of splinters and/or burns that occur while sliding ones finger(s) along in direct contact with the work piece. Also the tape measure may not always, during use, be at right angles to the edge of the work piece with the result of there being an error as to the correct location for the line and/or variations in the straightness of the line.

The purpose of the invention is to provide a guide that avoids having to slide ones fingers along the work piece and also provide more accuracy in marking.

PRIOR ART

Detachable elements for a tape measure, for use in marking, are known as for example by the teachings of the following U.S. Pat. Nos.:

4,113,199 issued Sept. 12, 1978 to Angelo Marino;
3,744,134 issued July 10, 1973 to Joseph J. Zima, Jr.;
3,160,957 issued Dec. 15, 1964 to H. G. Phillips;
3,181,242 issued May 4, 1965 to R. W. Cook;
3,192,630 issued July 6, 1965 to L. H. Dineson;
4,200,984 issued May 6, 1980 to R. D. Fink; and
2,795,050 issued June 11, 1957 to R. S. VanFleet.

While these references, in one form or another, are somewhat related to the present invention, they do not provide a simple, relatively inexpensive, readily useable and ready-to-use guide as does the present invention. The guides provided by Phillips and Zima are both slideably mountable on the tape which leaves the storage case portion of the tape dangling in mid-air during use.

An object of the present invention is to provide a guide that is simple to make and which is readily detachably mounted on the casing for the measuring tape.

SUMMARY OF INVENTION

In accordance with the present invention, there is provided a tape measure attachment that provides a guide for marking when moving the tape along a path on a work piece where the path is perpendicular to the length of the tape, said attachment being in the form of a T-square with a stem part that projects, at one end thereof, into the tape dispensing opening of the casing for the tape measure and at the other end has an angle head part at right angles to the stem. The angle head part has a first flange means that rests and slides on the surface of the work piece to be marked and a second flange means at right angles thereto that engages and slides along an edge of the work piece during use of the attachment. The first and second flange means are preferably turned upwardly at their opposite ends to form a skate or a ski that won't gouge into the work piece as the device is being slid therealong during use. The operator or user merely by finger and/or tape lock presses the tape onto the stem with the end of the tape measure being at the desired length from the second flange and while grasping the device with one hand, slides it along the work piece while holding a pencil at the free end of the tape to draw a line parallel to the edge of the work piece guided by the second flange.

It will be apparent from the drawings and detailed description that follows, additional features make the attachment an effective guard as well as a useful simple guide device.

LIST OF DRAWINGS

The invention as illustrated by way of example in the accompanying drawings wherein:

FIG. 1 is a side elevational view, in partial section, of a tape guide and guard device provided in accordance with the present invention;

FIG. 2 is an oblique view of a modified version of the tape measure attachment illustrated in FIG. 1;

FIG. 3 is a top plan view of the devices illustrated in FIGS. 2 and 2a;

FIG. 4 is a side elevational view of FIG. 3;

FIG. 5 is a sectional view taken along line 5—5 of FIG. 3;

FIG. 6 is an oblique view illustrating a minor modification to the guide of the present invention; and FIG. 7 is a partial oblique view illustrating a further modification.

DETAILED DESCRIPTION OF PREFERRED EMBODIMENTS

Figure 2A:
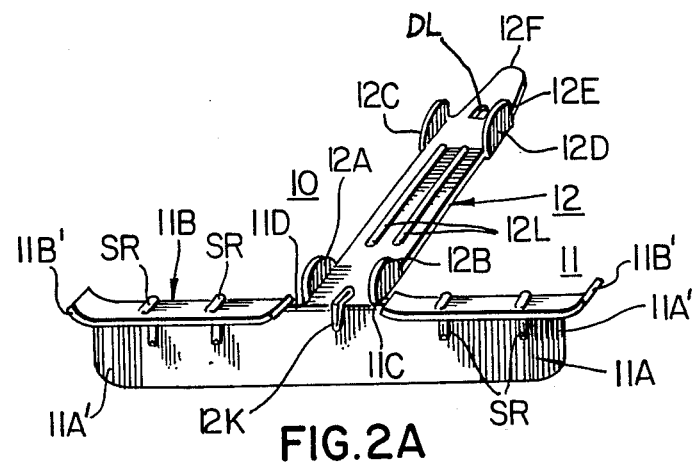
FIG. 2a is similar to FIG. 2 illustrating modifications thereto.

Illustrated in FIG. 1 is a tape measure guide device 10 detachably mounted on the casing 20 that houses the coiled-up portion 30 of a tape measure 31. The tape measure 31 passes through an aperture 21 in the casing and which is deeper than the thickness of the tape measure itself thus allowing insertion of a portion of the present device into the casing.

A simple form of a guide device of the present invention is illustrated in FIG. 2 and takes the general form of a T-square having a head portion 11 and a stem portion 12 projecting therefrom at right angles thereto. The head portion has a first flange 11a projecting downwardly from the stem and a second flange portion 11b projecting forwardly therefrom. The flanges 11a and 11b slide respectively on the edge and top face of the work piece such work piece in FIG. 1 being identified by the letters WP with a side edge SE and a top face TF.

During use the device is slid along the work piece and to prevent digging into the work piece, flange 11b is turned upwardly at its opposite ends as designated at 11b' and similarly the flange 11a is also turned backwardly away from the work piece as indicated at 11a'. The top flange 11b has an omitted central portion that provides an opening designated 11c visually to observe, during use, contact of the flange 11a with the edge of the work piece. This opening 11c is partially obstructed or covered by the tape measure during use and thus is longer than the width of the tape. This results in the edge of the flange 11b being spaced a selected amount from the edge of the stem 12 such amount being designated 11d.

Figure 2B:
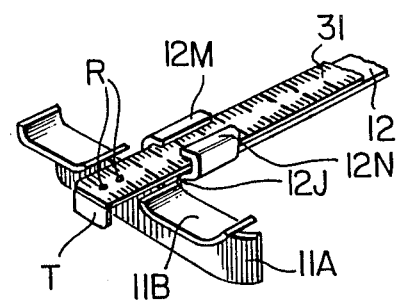
FIG. 2b is a partial view similar to FIGS. 2 and 2a and illustrating a further modification.

The stem 12 projects rearwardly from the flange 11a and may be integrally formed therewith as in the embodiment illustrated in FIGS. 2, 2a and 2b or attached to a separate head piece as is the case with the embodiments illustrated in FIGS. 6 and 7. The stem perferably is relatively thin and rigidified by a plurality of ribs 12L.

The stem 12 has a pair of upwardly projecting tabs 12a and 12b adjacent the head piece that provide a guideway preventing lateral shifting of the tape during use of the device. If desired tabs 12a and 12b can have respective end portions 12m and 12n bent inwardly toward one another as seen in FIG. 2b, but with sufficient space therebetween to insert the tape. Spaced rearwardly from tabs 12a and 12b, is a further pair of upwardly directed tabs 12c and 12d that have a vertical edge 12e spaced a selected distance forwardly of the trailing end 12f of the stem. The portion of the stem between tab edge 12e and the end 12f projects into the tape measure casing through the aperture 21 and the tab edge 12e limits the depth of penetration by engagement with the tape measure casing. The amount of penetration of the stem 12 into the tape measure casing is also limited by tab 12g struck out of and bent downwardly from the stem 12. In some instances it may be difficult to insert the stem portion into the tape dispensing opening in the casing in which case the opening can be enlarged and/or the width of the stem can be decreased and/or the thickness of the stem can be decreased. In FIG. 2a the stem portion is shown as being narrowed or tapered toward the end 12f.

As seen from FIG. 1, the tape measure casing can be held in the hand and the thumb of that hand is used to press the tape measure 31 onto the stem 12 of the guide. The downwardly projecting flange 11a slideably engages the work piece edge SE while the flange 11b slides on the upper surface of the work piece. A pencil is held by the users other hand against the end 32 of tape measure to draw a line on the top surface of the work piece as the device is moved along the work piece. The stem 12, being at right angles to the flange, ensures a relatively accurate measurement at all times. As seen from FIG. 5 the stem is preferably concave for receiving the tape.

In place of the thumb pressing the tape onto the device, or in addition thereto, the device 10 can be locked by the tape lock mechanism 40 pressing the tape 31 onto the stem 12. The lock mechanism illustrated is operated by a thumb manipulated cam type lever.

In FIG. 1 the stem 12 is shown as projecting only a short distance into the casing, but if desired it can project further to where it abuts against the far wall of the casing. In this case the tabs 12c, 12d and/or 12g may be dispensed with if so desired.

The device as described in detail with respect to the FIG. 2 embodiment, which is the simplest form, can be stamped from suitable material and bent into the appropriate shape or molded into the illustrated configuration. The device may be made from metal and/or a plastics material.

FIGS. 1, 6 and 7 illustrate variations to the foregoing described embodiment and which, in both FIGS. 1 and 6, have on the head part an upstanding flange 15 with a portion 16 thereof removed to allow the tape to pass therebeyond. In both of the embodiments of FIGS. 1 and 6, the forwardly projecting flange 11b is provided by a channel that, in the embodiment of FIG. 6, receives an end portion of the stem 12 and which is fastened thereto by clamping, welding, gluing or the like suitable means. In the embodiment illustrated in FIG. 1 this channel designated 17 has a top portion 17a above the surface TF of the work piece corresponding in height approximately to the length of the tab T on the end 32 of the tape measure. This allows the tape measure 31 to remain parallel to the work surface TF even when at a short distance from the flange location 11a. A modified version of this is shown in FIG. 2b and as seen therein the stem 12 merges into the flange 11a of the head part 11 by a neck portion designated 12j. This neck portion (which may be curved as illustrated or straight) raises the stem 12 above the plane of the lower face of flange 11 by an amount approximately equal to amount the tab T projects down from the end 32 of the tape measure. The tab T conventionally is attached to the tape measure by a pair of rivets R and for smooth operation the stem 12 is provided with a groove or depression 12k to receive the head of such rivets.

In the embodiment illustrated in FIG. 7 the stem 12 has a portion 12' projecting beyond the head part of the device. In this embodiment the head part is merely an angle member having flanges 17 and 18 with flange 18 welded, bonded, glued and/or riveted to the stem 12.

As previously indicated, a groove 12k is provided in the end of the stem and this can extend down into flange 11a so as to provide a stiffening rib. Further stiffening ribs SR are illustrated in FIG. 2a running from one to the other of flanges 11a and 11b. The stem also has stiffening ribs 12L, as shown in FIG. 2a. As a further modification, the stem necks down narrowing toward the end 12f and a dimple D.L. can be provided for retaining the stem in the tape measure casing.

I claim:

1. An attachment for a tape measure that provides a guide for marking when moving the tape along a path on a work piece where the path is perpendicular to the length of the tape;

said attachment being in the form of a T-square and comprising a stem part that projects at one end thereof into a tape dispensing opening of a casing that houses the tape measure and at the other end has an angle head part at right angles to the stem, said stem having tab means projecting therefrom and located at a position from the end of the stem that projects into said tape dispensing opening so as to limit the depth of penetration into the casing;

said head part having a first flange means resting and sliding on the surface of the work piece being marked and a second flange means at right angles thereto engaging and sliding along an edge of the work piece during use of the attachment.

2. An attachment as defined in claim 1 wherein said first and second flanges curve away from the work piece at their ends forming a skate, preventing gouging into the work as the device is slid therealong.

3. An attachment as defined in claim 1 wherein the stem and first flange are generally parallel to one another and offset from one another whereby the tape measure is spaced a selected amount above the work surface.

4. An attachment as defined in claim 1 wherein said first flange has an opening exposing the work piece in the vicinity of the tape measure supported on and extending beyond the end of said stem.

5. An attachment as defined in claim 1 including a first pair of spaced apart tabs projecting upwardly from said stem and located one on each of opposite edges of the tape measure so as to provide a guide for the same.

6. A guide device detachably mountable on a casing that houses a metal tape measure and wherein such tape is payed out and reeled in through a tape dispensing opening in said casing, said device comprising a one piece member in the form of a T-square that includes a stem and a head piece at right angles thereto, at least one tab means projecting from said stem and located at a position from the end of the stem that projects into said tape dispensing opening so as to limit the depth of penetration into the casing, said head piece comprising first and second angularly disposed flanges for engaging respectively a face and edge of a work piece, said first and second flanges being at right angles to said stem, at least one pair of tabs projecting upwardly from said stem and located one on each of opposite edges of said tape measure on said stem providing a guide for the same and a viewing aperture in said first flange exposing the work piece in the vicinity of at least one edge of the tape measure.

7. A device as defined in claim 6 including reinforcing ribs in said stem and further reinforcing ribs running from one to the other of said first and second flanges.

* * * * *